United States Patent
Snyder, II et al.

(10) Patent No.: US 9,268,694 B2
(45) Date of Patent: *Feb. 23, 2016

(54) MAINTENANCE OF CACHE AND TAGS IN A TRANSLATION LOOKASIDE BUFFER

(71) Applicant: Cavium, Inc., San Jose, CA (US)

(72) Inventors: Wilson P. Snyder, II, Holliston, MA (US); Bryan W. Chin, San Diego, CA (US); Shubhendu S. Mukherjee, Southborough, MA (US); Michael Bertone, Marlborough, MA (US); Richard E. Kessler, Northborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/038,225

(22) Filed: Sep. 26, 2013

(65) Prior Publication Data

US 2015/0089147 A1     Mar. 26, 2015

(51) Int. Cl.
G06F 13/12     (2006.01)
G06F 12/08     (2006.01)
G06F 12/10     (2006.01)

(52) U.S. Cl.
CPC ........ G06F 12/0808 (2013.01); *G06F 12/0802* (2013.01); *G06F 12/0888* (2013.01); *G06F 12/10* (2013.01); *G06F 12/1027* (2013.01); *G06F 12/1036* (2013.01); *G06F 12/1045* (2013.01)

(58) Field of Classification Search
CPC ............ G06F 12/0808; G06F 12/0802; G06F 12/0888; G06F 12/10; G06F 12/1027; G06F 12/1036; G06F 12/1045
See application file for complete search history.

(56) References Cited

U.S. PATENT DOCUMENTS

| 7,206,903 B1 | 4/2007 | Moir et al. |
| 7,444,493 B2 * | 10/2008 | Schoinas et al. ............... 711/206 |
| 8,356,158 B2 | 1/2013 | So et al. |
| 8,543,772 B2 | 9/2013 | Cota-Robles et al. |

(Continued)

FOREIGN PATENT DOCUMENTS

WO    WO 2013/101168 A1    7/2013

OTHER PUBLICATIONS

Non-Final Office Action for U.S. Appl. No. 14/038,383, "Translation Bypass in Multi-Stage Address Translation," Dated Nov. 20, 2014.

*Primary Examiner* — Henry Tsai
*Assistant Examiner* — Jing-Yih Shyu
(74) *Attorney, Agent, or Firm* — Hamilton, Brook, Smith & Reynolds, P.C.

(57) ABSTRACT

A computer system that supports virtualization may maintain multiple address spaces. Each guest operating system employs guest virtual addresses (GVAs), which are translated to guest physical addresses (GPAs). A hypervisor, which manages one or more guest operating systems, translates GPAs to root physical addresses (RPAs). A merged translation lookaside buffer (MTLB) caches translations between the multiple addressing domains, enabling faster address translation and memory access. The MTLB can be logically addressable as multiple different caches, and can be reconfigured to allot different spaces to each logical cache. Further, a collapsed TLB is an additional cache storing collapsed translations derived from the MTLB. Entries in the MTLB, the collapsed TLB, and other caches can be maintained for consistency.

21 Claims, 13 Drawing Sheets

(56) References Cited

U.S. PATENT DOCUMENTS

| | | |
|---|---|---|
| 8,595,464 B2 | 11/2013 | Levinsky et al. |
| 2003/0065890 A1 | 4/2003 | Lyon |
| 2006/0271760 A1 | 11/2006 | Nicolai |
| 2008/0276066 A1 | 11/2008 | Lee et al. |
| 2009/0228667 A1 | 9/2009 | Koehler et al. |
| 2009/0327647 A1 | 12/2009 | Ingle et al. |
| 2010/0058358 A1* | 3/2010 | Franke et al. ............... 719/319 |
| 2012/0297161 A1* | 11/2012 | Champagne et al. ......... 711/207 |
| 2013/0179642 A1 | 7/2013 | Plondke et al. |
| 2013/0262816 A1* | 10/2013 | Ronen et al. ................ 711/207 |
| 2014/0006681 A1* | 1/2014 | Chen et al. ....................... 711/3 |
| 2015/0089116 A1 | 3/2015 | Chin et al. |
| 2015/0089150 A1 | 3/2015 | Kessler et al. |
| 2015/0089184 A1 | 3/2015 | Mukherjee et al. |

* cited by examiner

MAINTENANCE OF CACHE AND TAGS IN A TRANSLATION LOOKASIDE BUFFER

BACKGROUND

In computer systems, virtualization is a process by which computing resources, such as a hardware platform, an operating system, or memory, are simulated by a computer system, referred to as a host machine. A typical host machine operates a hypervisor, which is software or hardware that creates and runs virtual machines, also referred to as guest machines. Through hardware virtualization, the hypervisor provides each guest machine with a virtual hardware operating platform. By interfacing with the virtual operating platform, the guest machines access the computing resources of the host machine to execute their respective operations. As a result, a single host machine can support multiple operating systems or other software simultaneously through virtualization.

In a typical host machine, the virtual operating platform is presented to the guest machines as a "real" hardware platform, meaning that the virtual nature of the hardware platform should not be discernible to the guest machines. Further, the host machine should avoid conflicts between guest machines in accessing computing resources. To accomplish these goals, the host machine may implement a translation scheme between the guest software and the physical host resources. With regard to memory resources, for example, the host machine may support virtual address spaces that are presented to respective guest machines. The virtual address space appears, to the guest machine, as a "real" (physical) address space. However, the host machine translates between the virtual address spaces and a physical address space corresponding to the memory of the host machine. As a result, the host machine can manage memory resources for multiple guest machines.

SUMMARY

Example embodiments of the present invention provide systems and methods for caching translations between address spaces in a virtualization environment. A circuit may include a first cache configured to store translations between address domains, where the first cache is addressable as a first logical portion and a second logical portion. The first logical portion is configured to store translations between a first address domain and a second address domain, and the second logical portion is configured to store translations between the second address domain and a third address domain. A second cache is configured to store translations between the first address domain and the third address domain based on entries in the first cache. A third cache may be configured to store tags associated with the translations of the first and second cache. A processor may operate to detect a deleted entry in at least one of the first logical portion and the second logical portion and invalidate corresponding entries in the second and third caches.

In further embodiments, the processor may be further configured to match an address request against the second cache and output a corresponding address result, and may match an address request against the third cache to locate a corresponding entry in the third cache. The circuit may further detect a deletion of an entry in the second logical portion and invalidate corresponding entries in the second and third caches, as well as identify the corresponding entries in the second and third caches via an identifier identifying a translation common to the deleted entry and the corresponding entries in the second and third caches.

In still further embodiments, each entry in the second cache may include a bit indicating whether the entry comprises an address from the first address domain or the second address domain. The processor may locate the corresponding entries in the second and third caches via the bit. In response to detecting an absence of a matching entry in the second cache, the processor may match the address request against the first cache, the address result corresponding to an entry in the first cache. The processor may also write an entry to the second cache based on entries in the first cache. In such a case, the processor may locate entries in the first and second logical portions having a common second address domain, and may also write the entry to the second cache based on the located entries in the first and second logical portions. The first address domain may be a guest virtual address domain, the second address domain may be a guest physical address domain, and the third address domain may be a root physical address domain.

In yet still further embodiments, a circuit may include a translation lookaside buffer (TLB) configured to store translations between address domains, where the TLB is addressable a guest TLB and a root TLB. The guest TLB may be configured to store translations between a guest virtual address (GVA) domain and a guest physical address (GPA) domain, and the root TLB may be configured to store translations between the GPA domain and a root physical address (RPA) domain. A collapsed TLB may be configured to store translations between the GVA domain and the RPA domain based on entries in the TLB. A data cache may be configured to store tags associated with the translations of the first and second cache. A processor may be configured to detect a deleted entry in the guest TLB and invalidate corresponding entries in the collapsed TLB and data cache.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

A computer system that supports virtualization may maintain multiple address spaces. Each guest operating system employs guest virtual addresses (GVAs), which are translated to guest physical addresses (GPAs). The GPA space refers to a partition of the physical memory allocated to the specified guest machine. However, the GVA space (rather than the GPA space) is presented to each guest machine in order to allow greater flexibility in memory allocation. For example, the GVA space of a given guest machine may be larger than the physical memory partition allocated to it, and data may be stored to a hard disk when the memory partition is at capacity.

A software system that manages one or more guest operating systems, such as a hypervisor, translates GPAs to corresponding root physical addresses (RPAs). The RPAs, also referred to as physical system addresses or machine addresses, indicate the location of the physical memory of the host computer. Thus, to complete a memory access by a guest machine, two translations occur: a GVA is first translated to a GPA, and the GPA is then translated to a RPA.

Addresses are initially translated between addressing domains (e.g. virtual address to physical address) by reading ("walking") a page table storing the relevant address relations. A translation lookaside buffer (TLB) is employed to cache such translations. Once a given translation is cached, the TLB is then accessed during future memory accesses requiring the given translation, thereby preventing the need for a further page table walk. In some virtualized systems, a TLB may cache translations from a GVA to a RPA. Alternatively, two physical TLBs may be employed: a first TLB storing GVA-to-GPA translations, and a second TLB storing GPA-to-RPA translations.

Figure 1:
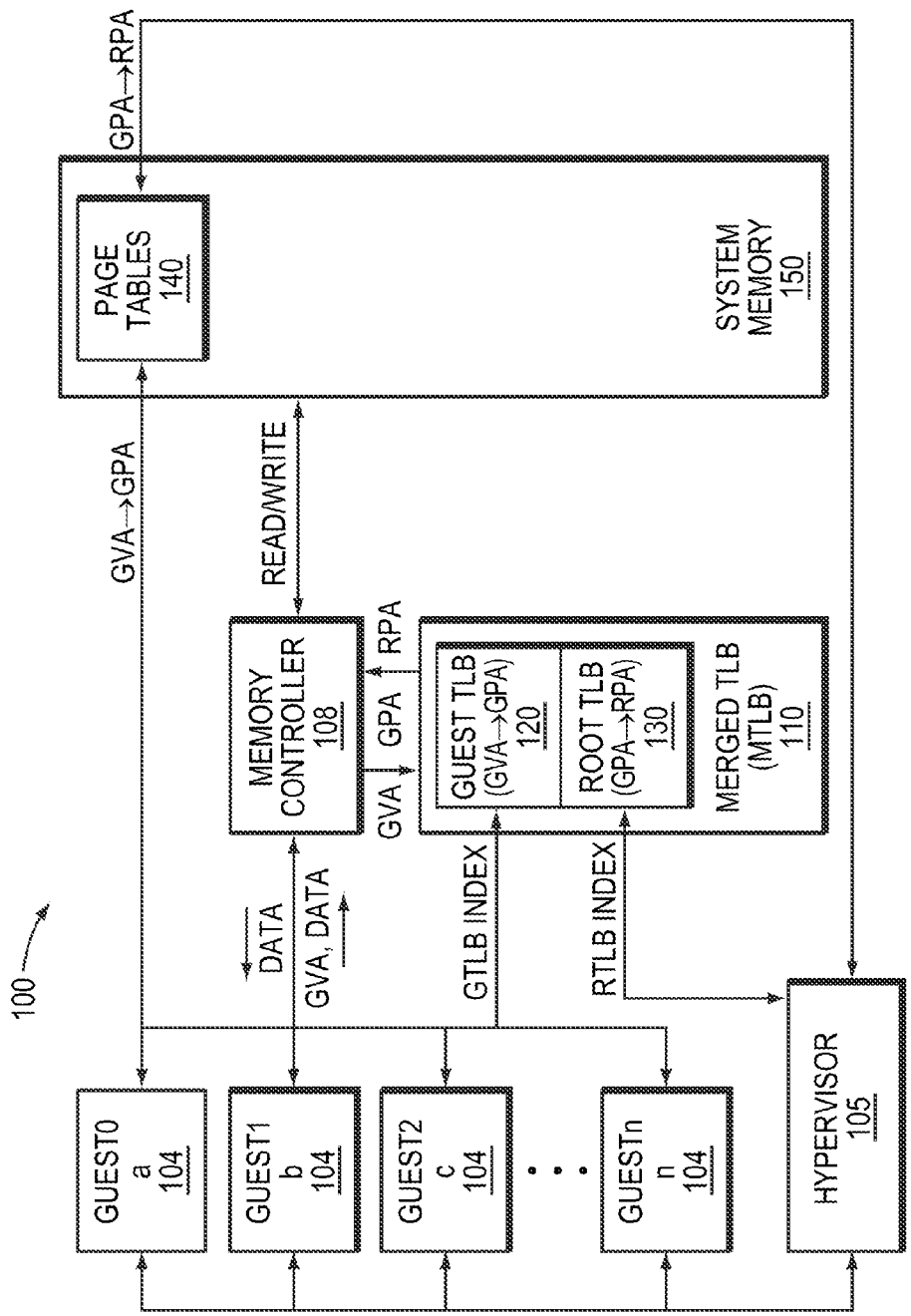
FIG. 1. is a block diagram of a computer system implementing a merged translation lookaside buffer (MTLB) in one embodiment.

FIG. 1. is a block diagram of a computer system 100 implementing a merged translation lookaside buffer (MTLB) in one embodiment. The system 100 shown may be a portion of host machine supporting a number of guest machines through virtualization. A plurality of guests (i.e., guest machines) 104a-n operate via respective guest operating platforms (not shown), which are virtual hardware platforms managed by the hypervisor 105. The guests 104a-n access the physical system memory 150 indirectly through a guest virtual address (GVA) space provided by the guest operating platforms. However, the system memory 150 is addressed through a root physical address (RPA) space. A GVA may be first mapped to a guest physical address (GPA), which is in turn mapped to a RPA at a partition of the system memory 150 allocated for the given guest 104a-n. Thus, to enable memory access by a guest 104a-n, a GVA may be translated to a GPA, which is then translated to a RPA indicating an entry of the system memory 150.

A memory controller 108, which may include hardware and a software portion of the guest operating platform, interfaces with the guests 104a-n to access the system memory 150. In order to access the system memory 150, the memory controller 108 first accesses the merged translation lookaside buffer (MTLB) 110. The MTLB 110 may include a single physical cache, buffer, segment register, system register, or other storage unit that is logically addressable as two distinct TLBs: a guest TLB (GTLB) 120 (a "virtual tag section") and a root TLB (RTLB) 130 (a "physical tag section"). The GTLB 120 stores GVA-to-GPA translations, and the RTLB 130 stores GPA-to-RPA translations. The MTLB 110 may therefore appear to other components as two distinct logical TLBs while sharing a single physical structure.

During a guest memory access, the memory controller 108 may receive a GVA from a guest 104a-n, which it then matches against entries in the GTLB 120 to determine a corresponding GPA. If a match is found, then the memory controller 108 matches the located GPA against entries in the RTLB 130 to determine a corresponding RPA. With the matching RPA, the memory controller 108 accesses the indicated entry of the system memory 150 for a read or write operation by the guest 104a-n.

Entries in the GTLB 120 may initially be added by the guests 104a-n, which accesses the page tables 140 stored at the system memory 150. The page tables 140 store relations between the GVA, GPA and RPA spaces, and may be "walked" to determine address translations between those address spaces. Thus, the guests 104a-n may walk the page tables 140 to determine a GVA-to-GPA translation, and then access the GTLB 120 via a GTLB index to store the translation at the GTLB 120. Likewise, entries in the RTLB 130 may initially be added by the hypervisor 105, which accesses the page tables 140 stored at the system memory 150. The hypervisor may walk the page tables 140 to determine a GPA-to-RPA translation, and then access the RTLB 130 via a RTLB index to store the translation at the RTLB 130. Entries into the GTLB 120 and RTLB 130 may be added, as described above, in response to a reported "miss" by the memory controller 108 in a translation lookup at the GTLB 120 or RTLB 130.

Configuration of the MTLB 110, as well as operation of the system 100 during memory access and populating the MTLB 110, is described in further detail below with reference to FIGS. 2-5.

Figure 2:
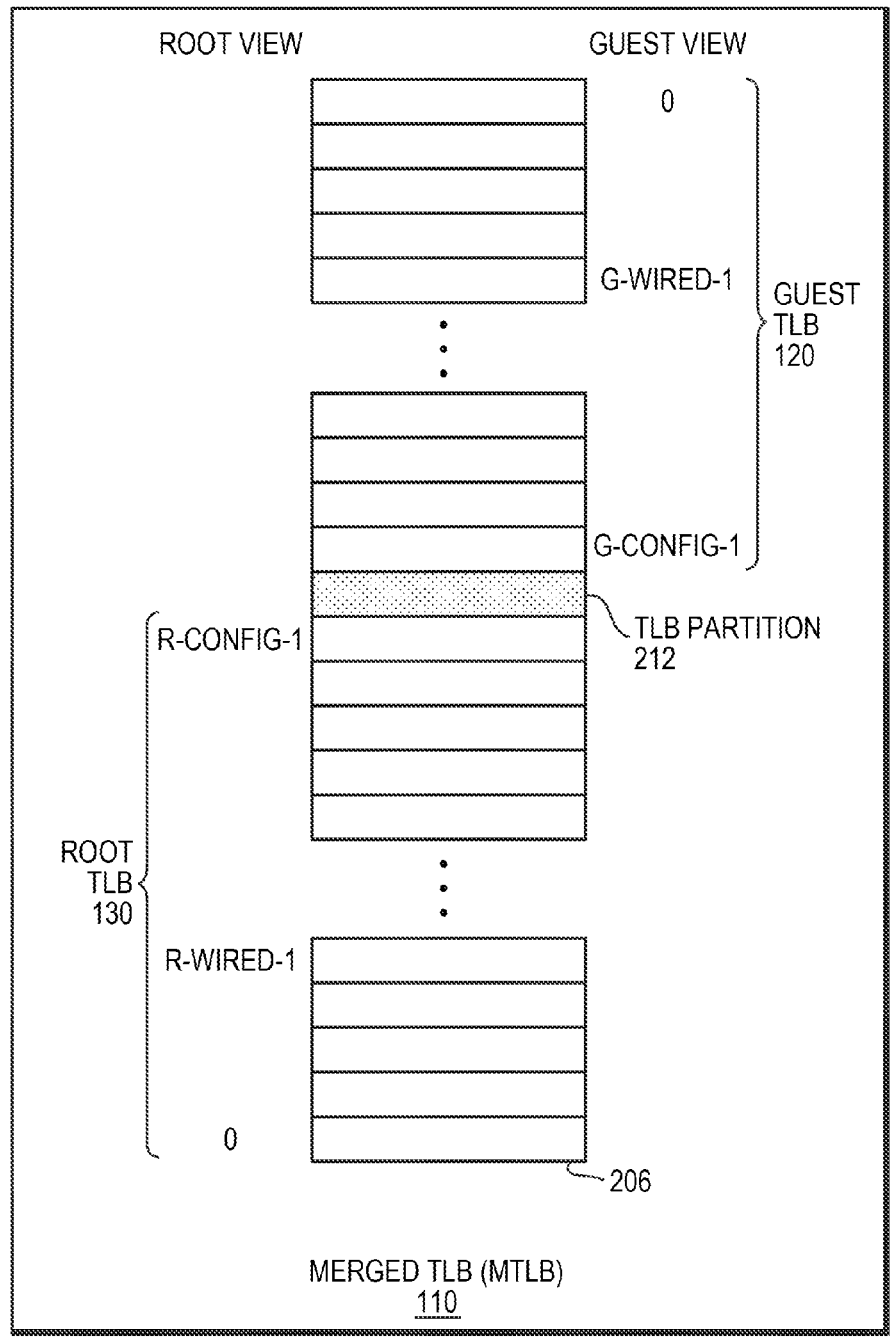
FIG. 2 is a block diagram of a partitioning of a MTLB.

FIG. 2 is a block diagram of a cache 206 of a MTLB 110. The cache 206 may be a single physical structure (e.g., memory or other storage device) that is divided logically into two or more segments. In this example embodiment, the cache 206 is divided into two logical portions to accommodate the GTLB 120 and the RTLB 130. A TLB partition 212 defines the division between the GTLB 120 and RTLB 130. In alternative embodiments, the cache 206 may be divided into additional segments to accommodate additional buffers, such as a TLB storing translations between additional address spaces. In such an embodiment, additional TLB partitions may be implemented to divide the cache 206 into the additional segments.

A programmable register (not shown), stored at the MTLB 110 or external to the MTLB 110, defines the position of the TLB partition 212 dividing the GTLB 120 and RTLB 130. Accordingly, all entries with physical indices lower than the partition 212 comprise the RTLB 130, and all entries with physical indices equal to or greater than the partition comprise the GTLB 120. The flexible partitioning between the GTLB 120 and RTLB 130 allows a system (e.g., system 100) to optimize the size of these structures, given the fixed number of total translation entries. The size of the TLBs 120, 130 can be changed at run-time. In addition, if the computer system is used in a non-virtualized environment, the partition 212 can be set such that the Root TLB takes up the entire MTLB cache 206. For such a configuration, a value may be reserved to represent 0 entries in the GTLB 120.

Software, such as the hypervisor 105 and guests 104a-n (FIG. 1), may view the TLBs 120, 130 as two logically distinct TLBs, with entries of each being indexed from 0 to the "G-Config −1" and "R-Config −1," respectively, which correspond to the size of each logical TLB 120, 130. For example, the RTLB 130 appears to the software as having entries from 0 up to R-Config −1, which is RTLB Size −1. The GTLB 120 appears to software as having entries from 0 up to G-Config −1, which is GTLB Size −1. (GTLB Size+RTLB Size=MTLB Size). As shown in FIG. 2, the sequence of entries in the cache 206 may be inverted between the GTLB 120 and RTLB 130, meaning that the GTLB 120 is ordered top-down and the RTLB 130 is ordered bottom-up. Such a configuration allows for easier resizing of the TLBs 120, 130 by repositioning the TLB partition 212, as only the terminal entries of each TLB 120, 130 may be changed or invalidated. In some embodiments, the RTLB 130 may have a size between 1 entry and the total number of entries in the MTLB cache 206. In contrast, the GTLB 120 may have a size between 1 and one less than the number of entries in the MTLB cache 206, as the RTLB 130 may be required to have at least one entry.

Figure 3:
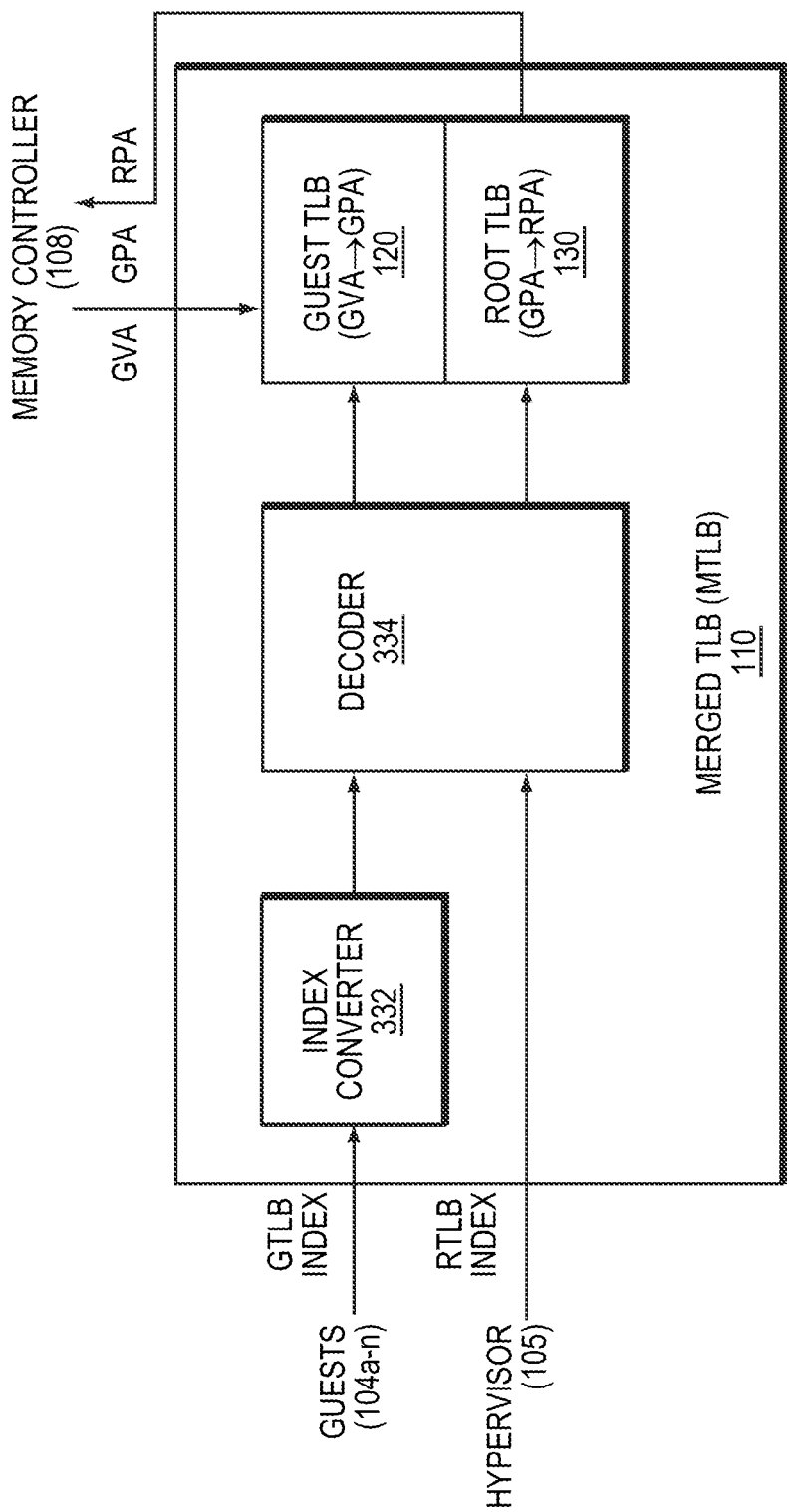
FIG. 3 is a block diagram of a MTLB.

FIG. 3 is a block diagram of a MTLB 110 in further detail. The MTLB 110 may be configured as described above with reference to FIGS. 1 and 2. The MTLB 110 interfaces with the memory controller 108 to provide match results of an address request (e.g., a GVA-to-GPA or GPA-to-RPA translation), and further interfaces with the guests 104*a-n* and hypervisor 105 to add and revise entries in the GTLB 120 and RTLB 130. The guests 104*a-n* or hardware on behalf of the guests may walk page tables (e.g., page tables 140, FIG. 1) to determine a GVA-to-GPA translation, and then access the GTLB 120 via a GTLB index to store the translation at the GTLB 120. Likewise, entries in the RTLB 130 may be added and revised by the hypervisor 105 or hardware on behalf of the hypervisor, which also accesses page tables 140 to determine GPA-to-RPA translations. Entries into the GTLB 120 and RTLB 130 may be added or revised in response to a reported "miss" by the memory controller 108 in a translation lookup at the GTLB 120 or RTLB 130.

To facilitate access to the GTLB 120 and RTLB 130, the MTLB 110 may also include a decoder 334, which allows software (e.g., guests 104*a-n* or hypervisor 105) to access the entries of the MTLB 110 with an index. Each entry in the MTLB 110 may be assigned such an index, and software may use the decoder 334 to read or write a particular entry. The decode logic may employ a physical index to identify a particular MTLB entry. Guests 104*a-n* may be limited to generate guest logical indices for writing to the GTLB 120. A hypervisor 105 (or other software with root access) may generate either guest logical or root logical indices for writing to the GTLB 120 or RTLB 130. An index converter 332 may be implemented to transform guest indices into a physical index corresponding to an entry of the GTLB 120.

In an example embodiment, a logical index to the GTLB 120 and RTLB 130 may be configured as follows. The total MTLB size may a power of 2, and the root logical index may equal the physical index (i.e., the index of the physical cache) for all root logical indices less than the RTLB 130 size. The guest logical index may be transformed to the physical index for all guest logical indices less than the GTLB 120 size. A software-based read-only registers may indicate the size of the GTLB 120 and RTLB 130, and is updated automatically after the partition between the GTLB 120 and RTLB 130 is configured.

The MTLB 110 may be a fully associative structure. If the MTLB 110 is configured as one physical TLB with associative match logic, a search in the MTLB 110 could result in matches to either a GTLB 120 entry or a RTLB 130 entry. In order for the associative logic to distinguish between GTLB 120 and RTLB 130 entries, each entry may be tagged with a bit, referred to as a Gt bit. If the Gt bit is 1, then an entry belongs to the GTLB 120; if the Gt bit is zero, an entry belongs to the RTLB 130. Thus, all RTLB 130 entries may have the Gt bit at zero, while all GTLB 120 entries may have the Gt bit at one. When an associative lookup on the RTLB 130 is required, the search value (key) sent to the MTLB 110 has Gt set to zero. Similarly, when an associative lookup on the GTLB 120 is required, the search value sent to the MTLB 110 has Gt set to one.

Random replacement may be utilized, as part of an algorithm handling a MTLB lookup "miss," by using a "random register." The random register may select a random entry within a portion of the selected GTLB 120 or RTLB 130. With reference to FIG. 2, for example, random replacement may be restricted to the segment between the "wired" entries (i.e., "G-Wired," "R-Wired") and the terminal entry of the respective TLB Referring again to FIG. 3 (and with reference to FIG. 1), when a hypervisor 105 switches between guests 104*a-n*, the guest TLB entries belonging to the outgoing guest (e.g., guest 104*a*) must to be replaced by the guest TLB entries of the incoming guest (e.g., guest 104*b*). The hypervisor 105 may manage the MTLB 110 to effect this change. Because the MTLB 110 may be a fully associate structure, the system should avoid sending in a value (key) to be matched that could match multiple entries. Matching multiple entries is usually considered a software error and may result in raising a fault, such as a machine check exception. During a write to a TLB, all entries may be checked for potential conflict. If a conflict is found, the write is prohibited, and a machine check exception is generated. In the particular case of changing guest operating systems, it may be expected that multiple entries in the GTLB 120 may match as the outgoing TLB entries are replaced by the incoming TLB entries. That is, incoming guest mappings might have the same or similar guest virtual addresses as outgoing guest mappings. Because this temporary situation may be resolved once the outgoing guest entries have been fully replaced by the incoming guest entries, a software control (managed, for example, by the hypervisor 105) may be provided to suppress the machine check exception during this guest operating system switch. This software control allows multiple entries in the guest TLB to match on a virtual address while the software is changing one context for another.

Referring back to FIG. 2, root software, such as a hypervisor 105 (FIG. 1), may program a register that defines the location of the partition 212 at run time, rather than during system configuration. Reprogramming of this register (e.g., during run-time) may automatically update the values in the architecturally-visible guest and root registers that identify the size of the GTLB 120 and RTLB 130. In other implementations, such updates could be performed directly by root software. When the RTLB 130 grows in size and the GTLB 120 shrinks in size, some entries that used to belong to the GTLB 120 now belong to the RTLB 130. Software may use TLB write index instruction to write these new entries with root mapping, or the entries can be written invalid. When the TLB write index instruction is performed, the Gt bit in each of these entries can be reset so they are properly marked as root entries. Failure to change the Gt bit could result in unpredictable behavior. Conversely, when the RTLB 130 shrinks in size and the GTLB 120 increases in size, some entries that previously belonged to the RTLB 130 now belong to GTLB 120. Root software may use the TLB guest write index instruction to write these entries with non-conflicting guest mapping, or the TLB entry can be written to invalid. When the TLB guest write index instruction is performed, Gt bit for such entries may be set such that the entries are now properly marked as guest entries. In an alternative embodiment, hardware might be used instead of software to properly configure the Gt bit when the entries are moved between the GTLB and RTLB.

The hypervisor 105, or other software or hardware, may be further configured to provide for bulk invalidation of entries in the GTLB 120. By using the Gt bit as an identifier, the hypervisor 105 can quickly invalidate all GTLB 120 entries. Alternatively, a circuit or other hardware may be configured to invalidate all entries with the Gt bit set to 1. As a result, a guest context can be erased quickly from the MTLB 110 without affecting the root TLB entries, such as during a switch between guests. In one embodiment, the current guest context is identified by a register that contains an address space identifier (also referred to as a virtual machine ID or VMID). The hypervisor 105 may change this value when switching the current guest context, and hardware (as described above) may automatically invalidate the guest context using the Gt bit, when software changes this value.

In further embodiments, an MTLB may be partitioned into three or more logical TLBs to accommodate multiple guest TLBs. The multiple guest contexts may be managed statically or dynamically. In a static configuration, instead of one TLB partition (e.g., TLB partition 212 of FIG. 2), multiple TLB partitions can be created. In such an embodiment, TLB segments can be managed as guest TLBs and root TLBs as described above, with the exception that entries in a guest TLB may not need to be replaced when switching between guests, provided that an additional guest TLB is available for the next guest. If guest contexts in the TLB are outnumbered by guests, then one or more guest TLBs can be erased and replaced with a new guest context as needed. The TLB partition sizes can be defined by a predefined set of system registers. Alternatively, the multiple guest contexts can be managed dynamically. For example, each TLB entry can be tagged with the appropriate guest context and interspersed with TLB entries from other software contexts.

Figure 4:
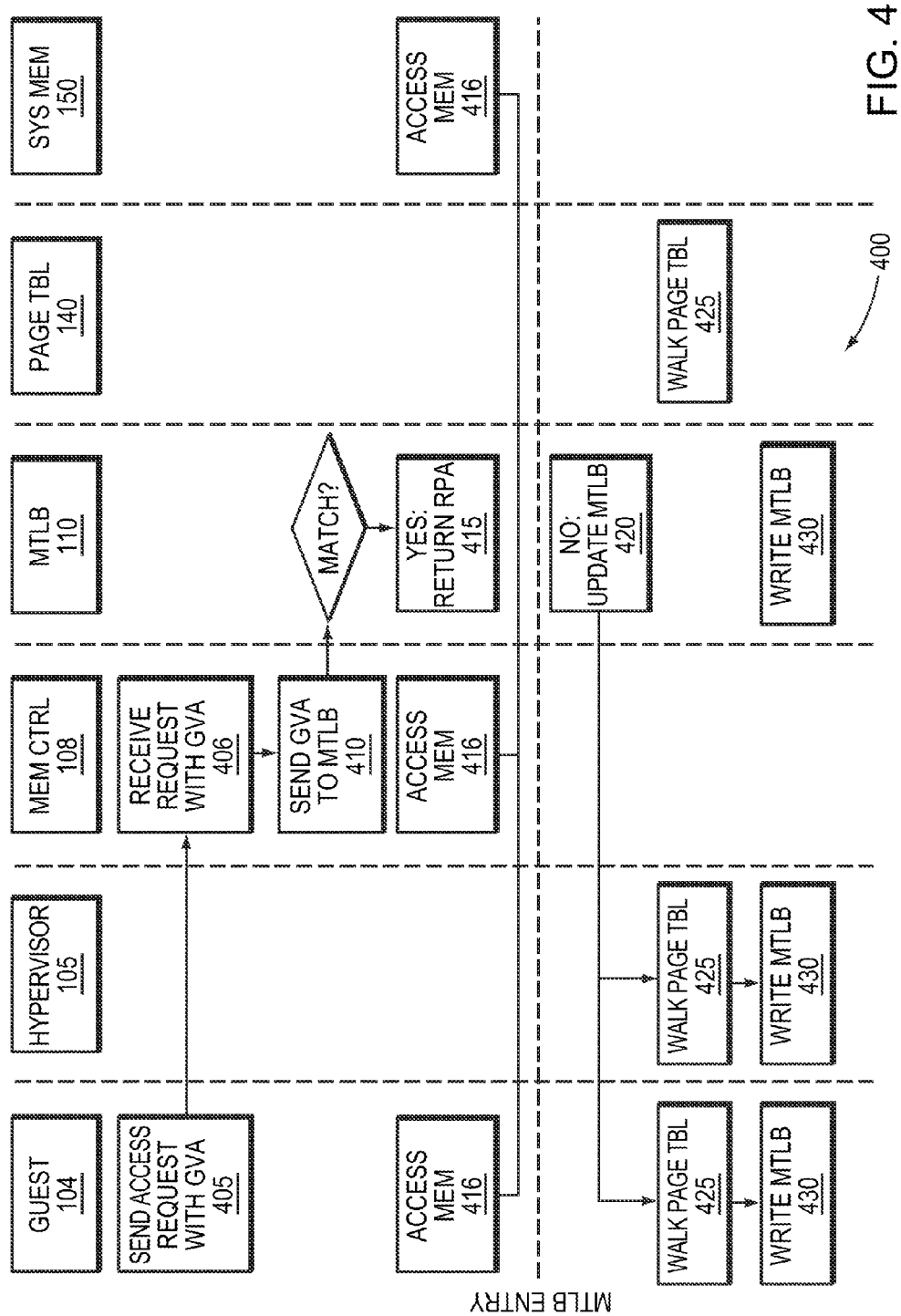
FIG. 4 is a flow diagram illustrating a process of accessing a system memory using a MTLB in one embodiment.

FIG. 4 is a flow diagram illustrating a process 400 of accessing a system memory using a MTLB in one embodiment. The process 400 includes scenarios both of a successful MTLB lookup, as well as an update to the MTLB upon a lookup "miss." With reference to FIG. 1, a guest 104*a* sends a memory access request (e.g., read or write to system memory) to the memory controller 108, with a GVA (405). The memory controller 108 receives the request and the GVA (406), and accesses the MTLB 110 to lookup a translation match to the GVA (410). If a match is found to a corresponding GPA, then the memory controller 108 further matches the GPA to locate a corresponding RPA, and the RPA is returned (415). Memory controller 108 then uses the RPA to access the corresponding entry of the system memory (416), enabling the guest 104*a* to perform the read or write operation to the system memory 150.

In the case of a failure to match to one or both of a GPA and RPA (i.e., an MTLB "miss"), the MTLB 110 is updated (420). To do so, one or both of the guest 104*a* and hypervisor 105 (or hardware on behalf of the guest 104*a* or the hypervisor 105) access the page tables 140 of the system memory 150. The guest 104*a* and/or hypervisor 105 walk the page tables 140 to determine the needed GVA-to-GPA and/or GPA-to-RPA translation (425). The guest 104*a* and/or hypervisor 105 may then write the translation(s) to the MTLB 110 (430) (e.g., as described above with reference to FIG. 3). Once the MTLB 110 is updated, the memory controller 108 may again perform a GVA match against the MTLB 110 and provide a memory access (416) upon returning a corresponding RPA (415).

Figure 5:
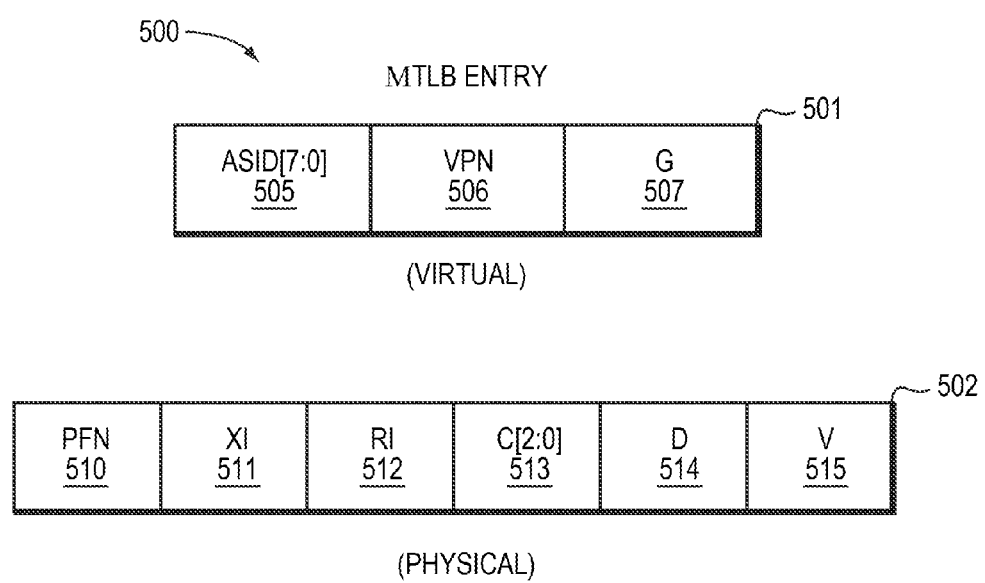
FIG. 5 is a block diagram of an entry in a MTLB.

FIG. 5 is a block diagram of an example entry 500 in a MTLB, such as an MTLB described above with reference to FIGS. 1-4. The entry may have a virtual portion 501 and a physical portion 502, where the virtual portion 501 contains the address to be matched (506) as well as other information and the physical portion contains the resulting translated address (510) as well as other information. The Gt bit, described above, may be an additional entry that is not visible to guest or root software.

The virtual portion may include the following entries:

ASID[7:0] (505): Address space identifier (ASID). If Gt=1, then this field holds the Guest ASID for this particular translation. If Gt=0, this field holds the Root ASID for this particular translation. This field may be ignored if G=1.

VPN (506): Virtual page number, indicating a GVA or GPA address.

G (507): Global bit. If Gt=1, then this bit represents the G bit of the Guest TLB entry corresponding to a GVA. If Gt=0, then this bit represents the G bit of a Root TLB entry corresponding to either a GPA or a RVA (Root Virtual Address).

The physical portion may include the following entries:

PFN (510): Physical Frame Number, indicates the Physical Page number of a GPA or RPA address. If Gt=1, then this field represents a GPA. If Gt=0, then this field represents an RPA.

XI (511): Execute Inhibit indicates that a mapping contains data and not instructions. If XI=1, then this page translation cannot be used for instructions and may only be used for data translations. If XI=0, then this translation can be used for either data or instructions.

RI (512): Read inhibit. The Read inhibit bit may be used to prevent a particular page from being read.

C[2:0] (513): Coherency attributes may be stored in the C field. These attributes can be used to determine the nature of the memory space (e.g. cacheable, uncached, coherent, non-coherent, I/O-space, etc).

D (514): Dirty bit. The dirty bit indicates whether a page has previously been written to.

V (515): Valid bit. The valid bit identifies whether the entry is valid or invalid.

Figure 6:
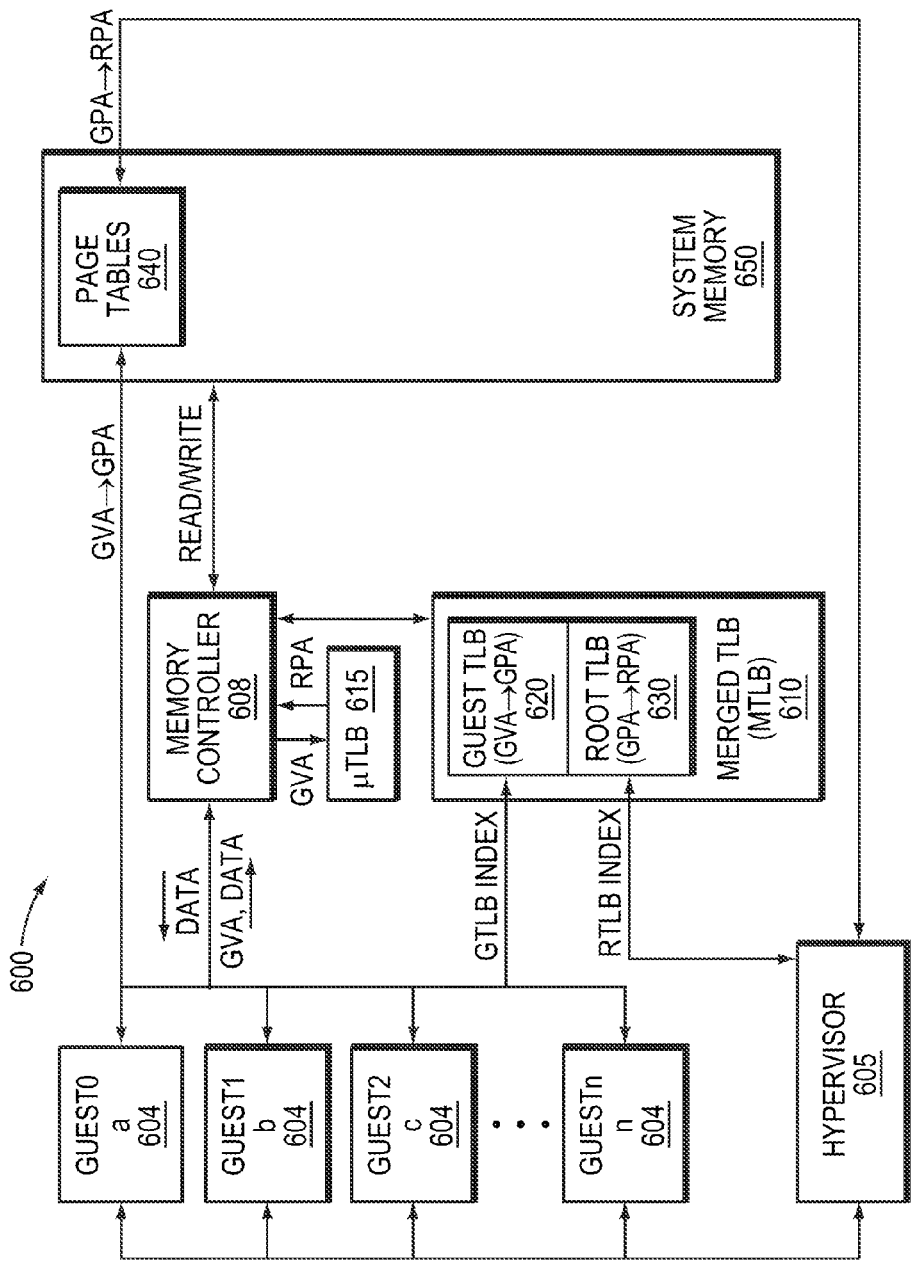
FIG. 6 is a block diagram of a computer system implementing a MTLB and a micro-translation lookaside buffer (μTLB).

FIG. 6 is a block diagram of a computer system 600 implementing a MTLB 610 and a micro-translation lookaside buffer (μTLB) 615. The system 600 may be configured similarly to the system 100 described above with reference to FIGS. 1-5, with the addition of the μTLB 615. The addition of the μTLB 615 may provide for faster address translation by caching collapsed translations between the GVA space and the RPA space.

The system 600 shown may be a portion of host machine supporting a number of guest machines through virtualization. A plurality of guests (i.e., guest machines) 604*a-n* operate via respective guest operating platforms (not shown), which are virtual hardware platforms managed by the hypervisor 605. The guests 604*a-n* access the physical system memory 650 indirectly through a GVA space provided by the guest operating platforms. In order to access the system memory 650, which is addressed through a RPA space, a GVA may be first mapped to a GPA, which is in turn mapped to a RPA at a partition of the system memory 650 allocated for the given guest 604*a-n*. Thus, to enable memory access by a guest 604*a-n*, a GVA may be translated to a GPA, which is then translated to a RPA indicating an entry of the system memory 650.

The MTLB 610 may be configured as described above with reference to the MTLB 110 of FIGS. 1-5. As such, the MTLB 610 may include a single physical cache that is logically addressable as two distinct TLBs: a guest TLB (GTLB) 620 and a root TLB (RTLB) 630. The GTLB 620 stores GVA-to- GPA translations, and the RTLB 630 stores GPA-to-RPA translations. The MTLB 610 may therefore appear to other components as two distinct logical TLBs while sharing a single physical structure. Entries in the GTLB 620 may initially be added by the guests 604a-n, which accesses the page tables 640 stored at the system memory 650. The page tables 640 store relations between the GVA, GPA and RPA spaces, and may be "walked" to determine address translations between those address spaces. Thus, the guests 604a-n (or hardware on behalf of the guest) may walk the page tables 640 to determine a GVA-to-GPA translation, and then access the GTLB 620 via a GTLB index to store the translation at the GTLB 620. Likewise, entries in the RTLB 630 may initially be added by the hypervisor 605 (or hardware on behalf of the hypervisor), which accesses the page tables 640 stored at the system memory 650. The hypervisor may walk the page tables 640 to determine a GPA-to-RPA translation, and then access the RTLB 630 via a RTLB index to store the translation at the RTLB 630. Entries into the GTLB 620 and RTLB 630 may be added, as described above, in response to a reported "miss" by the memory controller 608 in a translation lookup at the GTLB 620 or RTLB 630.

A memory controller 608, which may include hardware and a software portion of the guest operating platform, interfaces with the guests 604a-n to access the system memory 650. In order to access the system memory 650, the memory controller 608 first accesses the μTLB 615. The μTLB 615 may include a cache, buffer, segment register, system register, or other storage unit that stores GVA-to-RPA translations. During a guest memory access, the memory controller 608 may receive a GVA from a guest 604a-n, which it then matches against entries in the μTLB 615 to determine a corresponding RPA. If a match is found, then the memory controller 608 accesses the indicated entry of the system memory 650 for a read or write operation by the guest 604a-n. If a match is not found, then the memory controller 608 may access the MTLB to determine corresponding GVA-to-GPA and GPA-to-RPA translations. The memory controller 608 may further collapse the two translations to a single GVA-to-RPA translation, and may populate the μTLB 615 with the collapsed translation.

Configuration of the μTLB 615, as well as operation of the system 600 during memory access and populating the μTLB 615, is described in further detail below with reference to FIGS. 7-9.

Figure 7:
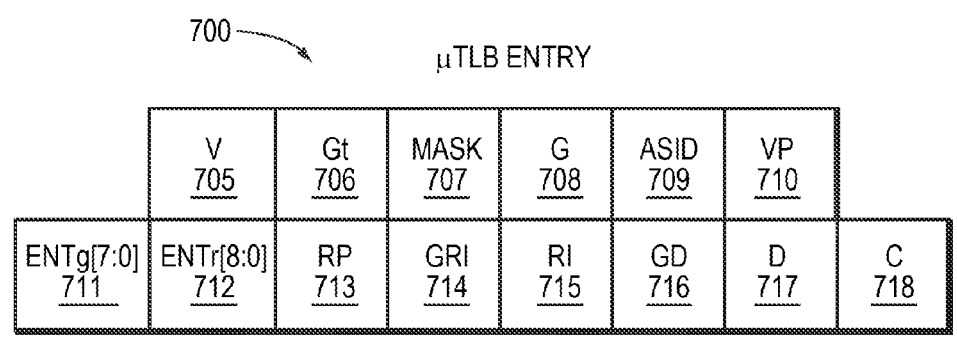
FIG. 7 is a block diagram of an entry in a μTLB.

FIG. 7 is a block diagram of an example entry 700 in a μTLB, such as a μTLB 615 described above with reference to FIG. 6. The entry 700 may include the following segments:

V (705): Valid bit. The valid bit indicates whether the entry is valid or invalid.

Gt (706): The Gt bit indicates if an entry belongs to the guest (Gt=1) or root context (Gt=0). If Gt=0, the VPN is a GPA or a RVA. If Gt=1, the VPN is a GVA or a GPA (for unmapped guest addresses). Use of the Gt bit avoids the need to tag each μTLB entry with the corresponding virtual machine ID (VMID).

Mask (707): These bits indicate to the comparator whether a particular address bit should be considered in the comparison or ignored.

G (708): This is the global bit. If Gt=1, then this bit represents the G bit of the Guest TLB entry corresponding to a GVA. If Gt=0, then this bit represents the G bit of a Root TLB entry corresponding to either a GPA or a RVA.

ASID (709): This is the ASID field. If Gt=1, then this field holds the Guest ASID for this particular translation. This field is ignored if G=1. If Gt=0, this field holds the Root ASID for this particular translation. This field is ignored if G=1.

VP (710): Virtual page number (for a GVA, GPA, or RVA).

ENTg[7:0] (711): ENTg is a guest entry number or another unique identifier that identifies the source of this translation. On MTLB writes, this number is used to selectively invalidate entries that might no longer represent valid translations. If Gt=0, this field is not used. [7:0]==0 which is in the Guest TLB indicates there is no guest translation in the guest TLB (e.g. unmapped guest address). ENTg is the absolute entry number (0-255) of the MTLB and not the "index" known to the guest.

ENTr[8:0] (712): ENTr is a root entry number or another unique identifier that identifies the source of this translation. Note that this field could be set for both Gt=0 and Gt=1. ENTr[8] is set to indicate that this μTLB entry does not have a MTLB root entry. This can occur if unmapped root addresses are inserted into the μTLB. ENTr is the absolute entry number (0-255) of the MTLB and not the "index" known to the root.

RP (713): Root page number. This field is either copied from the Root TLB EntryLo0 or EntryLo1 or may be a concatenation of GPA (from the guest TLB) and the RP (from the root TLB).

GRI (714): Guest read inhibit. The GRI bit reflects the value in the Guest TLB entry RI bit. This field is disregarded when Gt=0.

RI (715): Read Inhibit. The RI reflects the value the Root TLB RI bit. This field is "don't care" if Gt=0.

GD (716): Guest Dirty bit. The GD bit reflects the value of the D bit in the Guest TLB. This field may be disregarded if Gt=0.

D (717): Dirty bit. The D bit reflects the value of the D bit in the Root TLB.

C (718): Coherency bits. When Gt=1, C is taken from the guest TLB entry. When Gt=0, it is taken from the root TLB entry.

The values above are described in further detail below. If Guest=1 (i.e. a guest lookup is being performed), then only entries with Gt=1 are considered on a lookup. If Guest=0 (i.e. a root lookup is being performed), then only entries with Gt=0 are considered on a lookup.

Referring back to FIG. 6, when an address translation is required, the memory controller 608 accesses the μTLB 615 and searches for a match on the "VP" field. If a match is found, the corresponding RP contains the page number portion of the root physical address. Mask bits are used to determine which bits of the VP field are matched, and which bits of the RP are used to form the root physical address. When a miss occurs, hardware accesses the MTLB 610 and, depending on the type of address to be translated, performs either one (GPA-to-RPA) or two (GVA-to-GPA, GPA-to-RPA) lookups.

Turning again to FIG. 7, each μTLB entry 700 may represent the result of up to two translations steps. Some information from each of these steps must be preserved by the μTLB. The mask bits 707 are determined by the smaller of the guest page size and the root page size (i.e. the guest virtual to guest physical page size or the guest physical to root physical page size).

The G bit 708 represents the "Global" bit. Global addresses are ones where the ASID is ignored. If this is a mapping from a GVA to a RPA, the G bit is copied from the guest TLB (i.e., guest translation). If the mapping is for a GPA or RVA to a RPA, the G bit is copied from the Root TLB (i.e., root translation).

The ASID field 709 represents the address space identifier for a virtual address. The ASID 709 is used to distinguish between virtual addresses belonging to different contexts. If this is a mapping from guest virtual address to root physical address, the ASID field 709 is copied from the guest TLB (i.e., guest translation). If the mapping is for a GPA to a RPA, the ASID field is copied from the root TLB (i.e., root translation). The Virtual page number (VP) field 710 may be formed from the virtual address being translated, and the Root page number (RP) field 713 may be formed dependent on the relative page sizes of the guest and root translations (described in further detail below, with reference to FIGS. 9A-C).

Read Inhibit (RI) 715 may be used to prevent a particular page from being read. Because read permission depends on both the guest and root translation's value for this bit, both the guest and root read inhibit attributes are captured in the μTLB 615. The GRI (Guest Read Inhibit) may be copied from the guest TLB. If the translation is not a guest virtual address translation, then the GRI bit may be disregarded, and the RI bit 715 is copied from the root TLB entry. Similarly, the D (dirty) bit 717 indicates whether a page has previously been written to. Because the D bit 717 depends on both the corresponding guest and root translations' value for this bit, both the guest and root D bit attributes are captured in the μTLB 615.

The C bits 718 may relate to the coherency policy for a particular page. If mapping from GVA to RPA, the C field 718 may be copied from the corresponding entry of the guest TLB. If the mapping is for a GPA to RPA translation, then the C field 718 may be copied from the corresponding entry of the root TLB.

TABLE 1

Comparison of valid and invalid values of a μTLB entry.

| Operation | Mode | Gt | GRI | RI | GD | D | GXI | XI | Action |
|---|---|---|---|---|---|---|---|---|---|
| Load | Guest | 1 | 0 | 0 | x | x | x | x | OK |
|  |  | 1 | 1 | x | x | x | x | x | Guest Exception |
|  |  | 1 | 0 | 1 | x | x | x | x | Root Exception |
|  | Root | 0 | x | 0 | x | x | x | x | OK |
|  |  | 0 | x | 1 | x | x | x | x | Root Exception |
| Store | Guest | 1 | x | x | 0 | 0 | x | x | Guest Exception |
|  |  | 1 | x | x | 1 | 0 | x | x | Root Exception |
|  |  | 1 | x | x | 1 | 1 | x | x | OK |
|  | Root | 0 | x | x | x | 0 | x | x | Root Exception |
|  |  | 0 | x | x | x | 1 | x | x | OK |
| Instruction | Guest | x | x | x | x | x | 0 | 0 | OK |
|  |  | x | x | x | x | x | 1 | x | Guest Exception |
|  |  | x | x | x | x | x | 0 | 1 | Root Exception |
|  | Root | x | x | x | x | x | x | 0 | OK |
|  |  | x | x | x | x | x | x | 1 | Root Exception |

Table 1 presents the possible values of a μTLB entry, and indicates valid combinations of values, as well as combinations of values that can generate an "exception" during a μTLB lookup. Upon accessing the μTLB, an exception condition may occur in the guest (e.g., an instruction fetch, a load or store violation). After the guest software addresses the exception conditions, the instruction may be re-executed. Upon re-execution, the guest permission check may pass, but a root TLB protection violation may exist. The exception would then be signaled to the root context. A μTLB exception may be considered a "miss," and is handled as described below with reference to FIG. 8.

Figure 8:
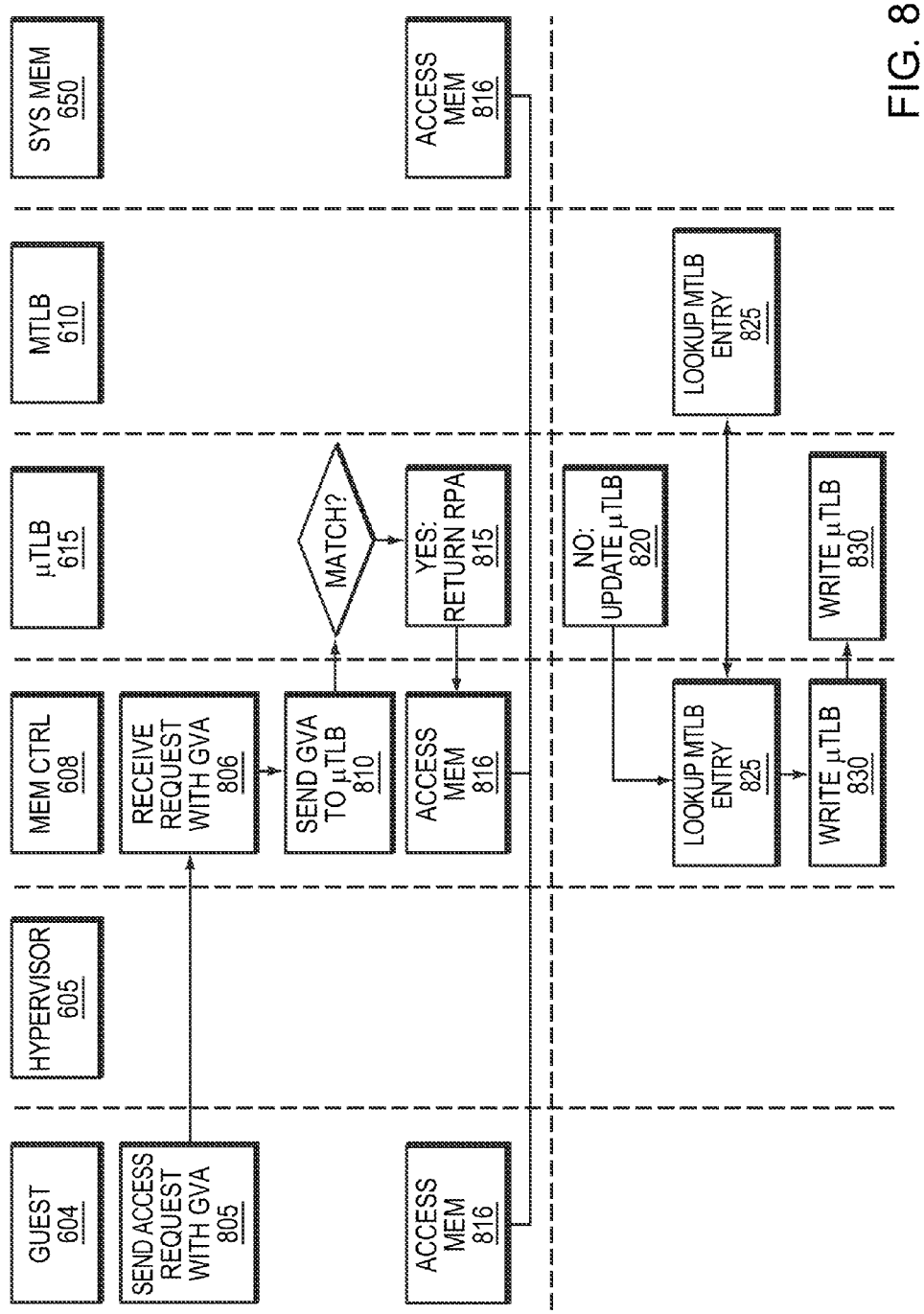
FIG. 8 is a flow diagram illustrating a process of accessing a system memory using a μTLB in one embodiment.

FIG. 8 is a flow diagram illustrating a process 800 of accessing a system memory using a μTLB in one embodiment. The process 800 includes scenarios both of a successful μTLB lookup, as well as an update to the μTLB upon a lookup "miss." With reference to FIG. 6, a guest 604a sends a memory access request (e.g., read or write to system memory) to the memory controller 608, with a GVA (805). The memory controller 608 receives the request and the GVA (806), and accesses the μTLB 615 to lookup a translation match to the GVA (810). If a match is found to a corresponding RPA, then the RPA is returned (815). The memory controller 608 then uses the RPA to access the corresponding entry of the system memory (816), enabling the guest 604a to perform the read or write operation to the system memory 650.

In the case of a failure to match to a GPA or RVA (i.e., a μTLB "miss"), the μTLB 615 is updated (820). To do so, the memory controller 608 may operate as a μTLB "miss controller." (In alternative embodiments, a μTLB miss controller may be configured separately from the memory controller 608). The memory controller 608 may access the MTLB 610 to retrieve corresponding GVA-to-GPA and GPA-to-RPA translations (825). (Alternatively, the memory controller 608 may access only a GPA-to-RPA translation if the given μTLB entry is a GPA-to-RPA translation.) With the corresponding translations from the MTLB 610, the memory controller 608 generates a valid GVA-to-RPA translation, and writes the translation to the μTLB 615 (830). Once the μTLB 615 is updated, the memory controller 608 may again perform a GVA match against the μTLB 615 and provide a memory access (816) upon returning a corresponding RPA (815).

To create a μTLB entry, including the fields described above with reference to FIG. 7, the memory controller 608 may import from fields of entries in both the GTLB and RTLB of the MTLB 610. With reference to FIGS. 5 and 7, the fields of a μTLB entry may be filled as follows:

V: 1 (hardware valid bit).
Gt: 1 (this is a guest mapping).
Mask: (set to minimum of RootMask size and GuestMask size).
G: copied from Guest.TLB.
ASID: copied from Guest context.
VP: GVA.
RP: RP.
GRI: copied from Guest.TLB.
RI: copied from the Root.TLB.
GD: copied from the Guest.TLB.
D: copied from the Root.TLB.
GXI: copied from the Guest.TLB.
XI: copied from Root.TLB.
C: copied from the Guest.TLB.
ENTg[7:0]: set to the index of the Guest.TLB entry.
ENTr[8:0]: set to the index of the Root.TLB entry.

Figure 9A:
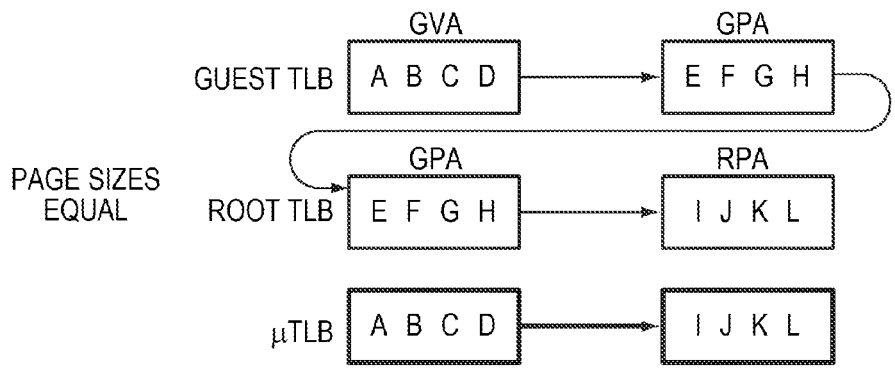
FIGS. 9A-C are block diagrams illustrating collapsed translations entered into a μTLB.
Figure 9B:
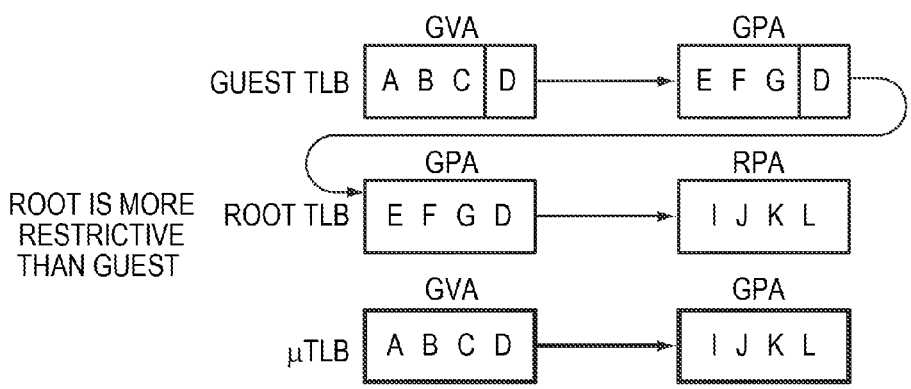
Figure 9C:
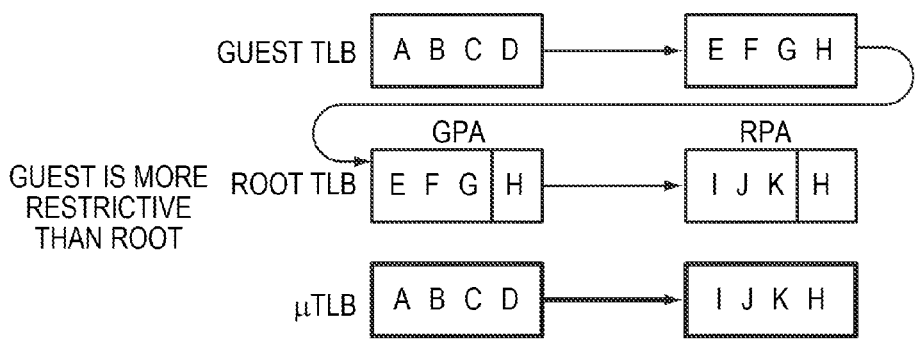

FIGS. 9A-C are block diagrams illustrating collapsed translations entered into a μTLB. As described above with reference to FIG. 7, in a μTLB entry 700, the virtual page number (VP) field 710 may be formed from the virtual address being translated, and the root page number (RP) field 713 may be formed dependent on the relative page sizes of the guest and root translations. Generation of the VP and RP may be a function of the relative page masks of the Guest and Root TLBs. There are three cases to consider: 1) root and guest entries have the same page size, 2) the root entry has a smaller page size than the guest entry, and 3) the guest entry has a smaller page size than the root entry.

FIG. 9A illustrates a collapsed translation when root and guest entries used in the translation have the same page size. In such a case, the generation of the VP and RP may be relatively straightforward. The mask is set to the appropriate page size, the VP is copied from the VPN field (506) of the GTLB, and the RP is copied from the PFN field (510) of the root TLB.

FIG. 9B illustrates a collapsed translation when the root entry has a smaller page size than the guest entry (i.e., the GVA-to-GPA translation specifies a larger page size than that of the GPA-to-RPA translation). In such a case, the VP may be generated from a combination of the GVA and the VPN field (506) of the GTLB. Thus, the VP is set to the GVA with the page mask of the root TLB. The RP may be copied from the PFN field (510) of the root TLB.

FIG. 9C illustrates a collapsed translation when the guest entry has a smaller page size than the root entry (i.e., the GVA-to-GPA translation specifies a smaller page size than that of the GPA-to-RPA translation). In such a case, the VP may be taken from the guest TLB's VPN field (506). The RP may be a concatenation of the PFN field (510) of the GTLB and the PFN field (510) of the RTLB. In particular, upper GPA bits down to the Root page size are taken from the Root TLB's physical tag). The lower bits down to the Guest page size may be taken from the Guest TLB's physical tag (GPA).

In further embodiments, the μTLB may cache multiple types of translations. For example, the μTLB can cache translations to a RPA from a GVA as described above, as well as from a GPA or a root virtual address (RVA), which may be an address of a virtual memory employed by the hypervisor. Because there can be aliases (similar addresses that represent possibly different root physical addresses) between GVAs and GPAs, the μTLB can include a Gt bit as described above. If the Gt bit of an entry is one, then the entry's VP represents a Guest Virtual Address. Similarly, if an entry's Gt bit is zero, then the entry's VP represents a GPA or RVA. The Gt bit may also enable hardware to quickly invalidate guest translations (i.e., GVA-to-GPA translations) when changing guests without disturbing mappings (i.e., GPA-to-RPA translations) owned by the hypervisor.

In still further embodiments, the μTLB may cache translations between any number of address domains. For example, some virtualization systems may implement an additional address domain between the GVA, GPA and RPA domains, such as "secure RPA" (SPA), which may be implemented between the GPA and RPA domains. To accommodate such an addressing system, a MTLB may include three or more logical portions to store translations. In a specific example including the SPA domain, the MTLB may include a first logical portion storing GVA-to-GPA translations, a second logical portion storing GPA-to-SPA translations, and a third logical portion storing SPA-to-RPA translations. Accordingly, the μTLB may be configured to cache translations between the GVA domain and the RPA domain, thereby collapsing translations between four address domains.

In still further embodiments, translations may be held in any level of a multi-level translation storage hierarchy. Each storage level can hold direct translations (i.e., translations between two successive address domains) or collapsed translations (i.e., translations between two address domains separated by one or more intermediate address domains). In a specific example, a system may be configured for four logical domains and three storage levels. The third storage level three may hold collapsed translations from a first to a final address domain. A second level may hold direct translations from first to second logical domain and collapsed translations from second to final logical domain. Lastly, a first level may hold direct translations from first to second, second to third, and third to fourth logical domains.

Figure 10:
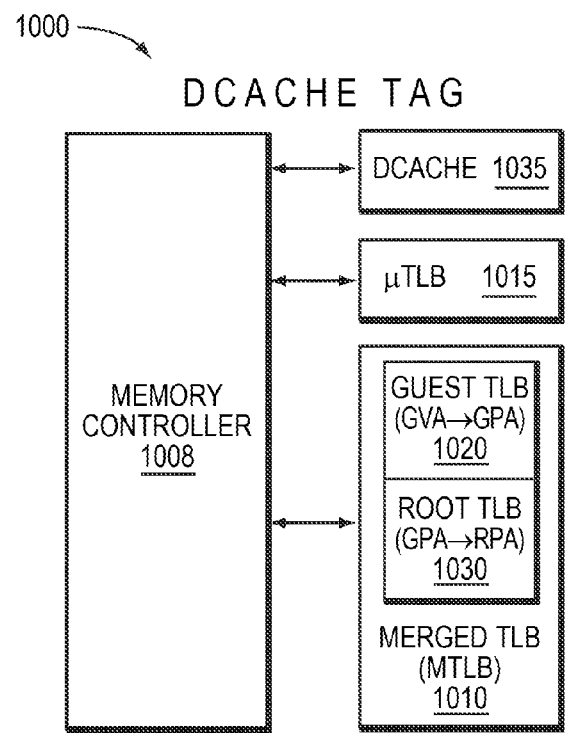
FIG. 10 is a block diagram illustrating a set of TLBs and virtual data cache in a further embodiment.

FIG. 10 is a block diagram illustrating a portion of a computer system 1000 implementing a plurality of TLBs and virtual data cache in a further embodiment. The system 1000 may be configured as described above with reference to the computer systems 100 and 600 of FIGS. 1 and 6, respectively. In particular, the memory controller 1008, MTLB 1010 and μTLB 1015 may be configured similarly to those components described above. The system 1000 further includes a virtual data cache 1035, which may be a distinct hardware cache addressable separately from the MTLB 1010 and μTLB 1015. The data cache 1035 may be used to store the values represented in the system memory (such as system memories 150, 650). Data are located in the data cache 1035 by means of a tag. The data cache 1035 may be configured to store tags associated with translations stored at the MTLB 1010 and μTLB 1015. A tag stored at the data cache 1035 may contain, for example, a subset of the fields of an associated entry of the μTLB 1015. By maintaining this data in the data cache 1035, hardware such as the memory controller 1008 may benefit from faster access to these entries during a translation lookup in a memory access operation. For example, the data cache 1035 may be configured as a first reference for some or all translation lookups, the system retrieving data from the data cache to avoid references to other structures such as μTLB 1015, MTLB 1010 and system memory 150 or 650. In alternative embodiments, a tag stored at the data cache may contain a subset of the fields of associated entries in one or both of the MTLB 1010 and μTLB 1015.

Figure 11:
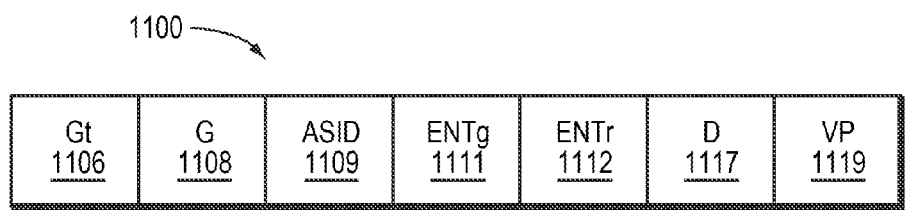
FIG. 11 is a block diagram of an example data cache tag.

FIG. 11 is a block diagram of an example data cache tag 1100, which may be stored in the data cache 1035 described above with reference to FIG. 10. In this example data cache tag, all fields may be populated from the corresponding fields of an associated entry of the μTLB (e.g., μTLB 1015). The fields populated from the μTLB may include a Gt bit 1106, a G bit 1108, an ASID field 1109, an ENTg field 1111, and ENTr field 1112, a D bit 1117, and a VP bit 1119, each of which are described above with reference to FIGS. 5 and 7. Example processes by which the data cache is populated and entries are maintained among the MTLB, μTLB and data cache is described below with reference to FIG. 12.

When a mapping between a virtual address and a root physical address changes, any TLB entries that contained information from the previous mapping between a virtual address and a root physical address may be replaced or invalided in the TLB. This replacement may be done in either hardware or software means. When either a guest virtual address to guest physical address mapping is changed by software, the guest TLB may be updated. Both the μTLB and data cache may have used information from the previous guest TLB mapping to cache either an address translation or data value, respectively. In order to maintain address and data consistency, any μTLB entry or data cache entry associated with the prior mapping may be invalidated. In one embodiment, this invalidation may be done by hardware, such as a memory controller. The ENTg and ENTr values uniquely identify the TLB entries used to form a μTLB entry or a data cache tag, and therefore may be searched when identifying matching entries.

Figure 12:
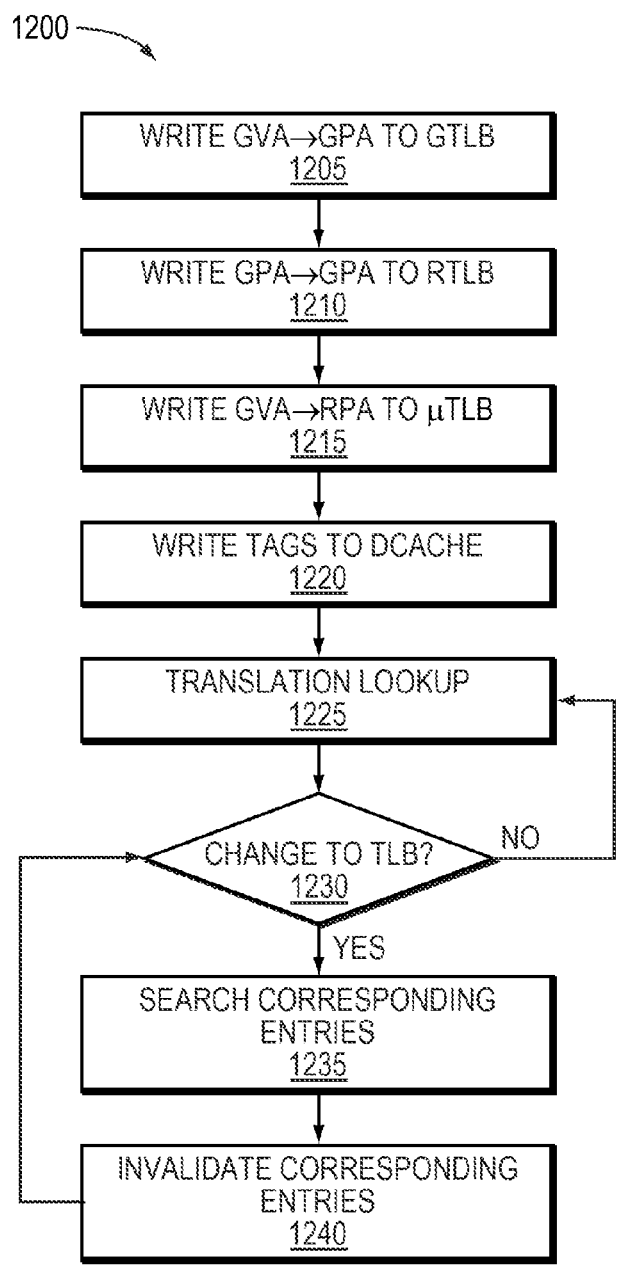
FIG. 12 is a flow diagram illustrating a process of maintaining entries across multiple caches.

FIG. 12 is a flow diagram illustrating a process 1200 of maintaining entries across multiple caches. With reference to FIG. 10, entries to the GTLB 1020, RTLB 1030 may be populated and updated as described above with reference to FIG. 4 (1205, 1210), and the μTLB 1015 may be populated and updated as described above with reference to FIG. 8 (1215). Further, the memory controller 1008 or other hardware may write tags to the data cache 1035 by exporting the selected subset of fields of a given μTLB entry (1220). With entries of the MTLB, μTLB and data cache populated, the memory controller 1008 may perform translation lookups in response to memory access requests as described above with reference to FIGS. 4 and 8 (1225).

The memory controller 1008 or other hardware may further monitor the MTLB 1010 for changes to entries therein, such as the replacement of an entry with another entry, a deletion of an entry, or an invalidation of an entry (1230). If such a change is detected, then the memory controller 1008 may search each of the μTLB 1015 and data cache 1035 to locate entries and tags corresponding to the changed entry (1235). Upon locating such entries and tags, they may be invalidated by modifying their respective "valid" bit (1240). Example embodiments of maintaining entries across the MTLB 1010, μTLB 1015 and data cache 1035 is described in further detail below.

When a GTLB 1020 entry is replaced, any μTLB 1015 or data cache 1035 entries that contain information derived from that entry may be required to be invalidated. Tag values such as the ENTg field (described above) may be used for such invalidation. In addition, a unique identifier associated with the GTLB entry may be used to find all the μTLB and data cache entries that contain information from that GTLB entry. In one embodiment, the unique identifier may be the physical index of a GTLB entry. First, a search of the μTLB and data cache entries that have Gt equal to one may be performed. All entries that match on their ENTg field with the physical index of the Guest TLB entry being replaced may be invalidated by the memory controller or other hardware. This search may be done sequentially, associatively, or some combination thereof. Using the ENTg field may simplify the invalidation task by eliminating the need to compare against virtual address tags, which might have to be adjusted to accommodate for differing address widths (e.g. cache line size versus page size), and finding the virtual address value to compare against. Using the ENTg field may also enable the use of a virtual cache by minimizing the die area required by the content-addressable memory (CAMs) for invalidation and narrowing the invalidations to just the subset of tags needed to maintain address and data consistency. In an alternative embodiment, a bulk invalidation may be performed whereby all the data cache and μTLB tags with Gt equal to one are invalidated. In a further alternative, a bulk invalidation may be performed whereby all the data cache and μTLB tags regardless of their Gt bit value.

When a RTLB 1030 entry is replaced, any μTLB 1015 or data cache 1035 entries that contain information derived from that entry may be required to be invalidated. The ENTr field may be used for such invalidation. Further, a unique identifier associated with the RTLB entry may be used to find all the μTLB and data cache entries that contain information from that RTLB entry. In one embodiment, the unique identifier is the physical index of a Root TLB entry. A search of the μTLB and data cache entries may then be performed. All entries that match on their ENTr field with the physical index of the Root TLB entry being replaced are invalidated by hardware. This search may be done sequentially or associatively or some combination of the two. In contrast to a GTLB replacement case, the value of the Gt bit may be considered irrelevant because both Guest entries and Root entries may rely on a root mapping.

If the ENTr field were not implemented for invalidating entries, removing a root TLB entry may require some other form of data cache and μTLB invalidation. As an alternative, the entire data cache and μTLB may be invalidated. In a further alternative, the virtual tag may be matched for invalidation. However, upon the removal of a root TLB entry, invalidating guest entries with GVA tags can present further challenges. Specifically, in some embodiments, there is no reverse mapping between the GPA of a root TLB entry and the possibly multiple GVAs that map to it. Thus, in such an embodiment, a further component may be required to deduce the GVAs that map to the GPA that matches the root TLB entry being replaced.

Figure 13:
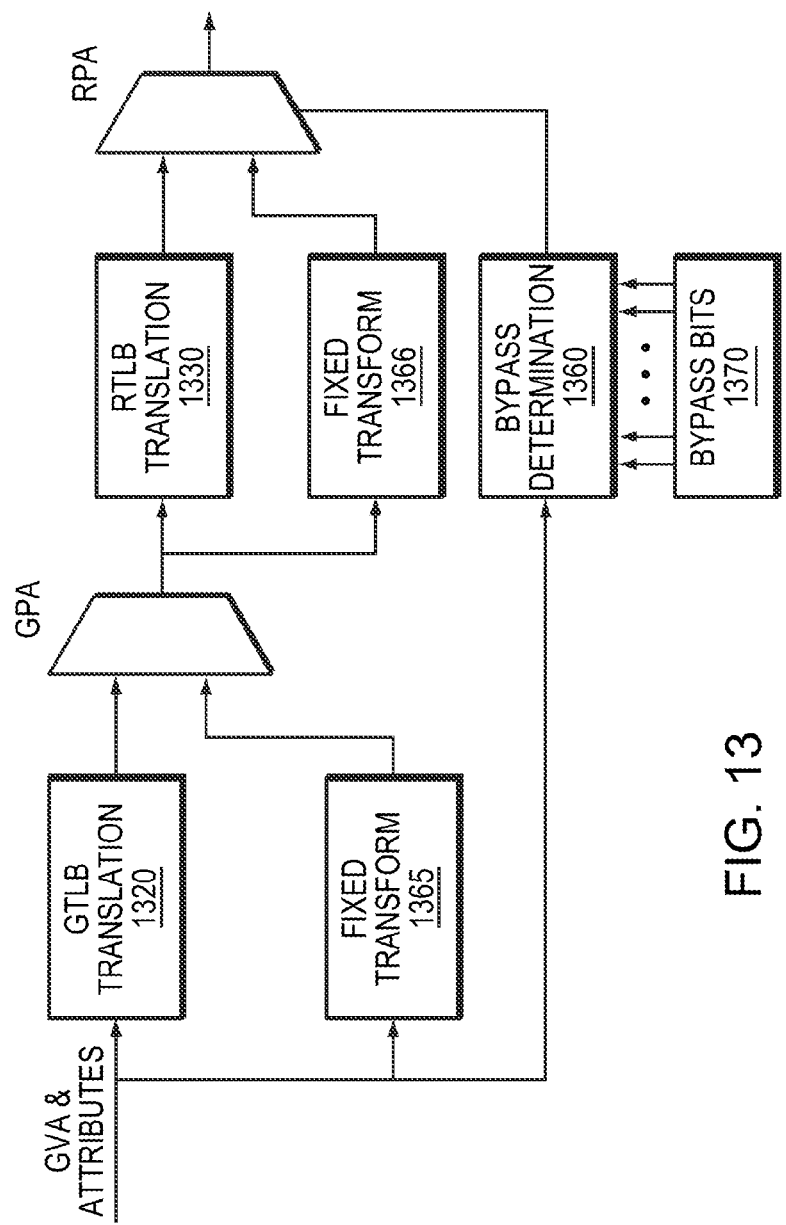
FIG. 13 is a block diagram illustrating a selective bypass of address translation in a further embodiment.

FIG. 13 is a block diagram illustrating a selective bypass of address translation in a further embodiment. In some computer architectures, a virtual address may sometimes bypass address translation and undergo some fixed address transformation from virtual address to physical address. Additionally, is some cases a virtual address may be translated, but the region undergoing the translation has some differentiated attribute, such as an attribute that classifies an address as an I/O address. For example, in the Microprocessor without Interlocked Pipeline Stages (MIPS) architecture, certain virtual addresses do not have corresponding TLB entries. Instead, for certain ranges of virtual address, the address is transformed to physical address by applying a mask such that the low order bits of the virtual address become the physical address. Similar fixed-function transformations are possible in other architectures, through the use of base and limit registers or similar systems.

When virtualization via a multi-stage address translation system is introduced, the possibility of unmapped or bypass virtual addresses may occur at any stage. In addition, mapped virtual addresses may be assigned some special attributes in the guest translation process. In one embodiment with a two-stage translation scheme, an unmapped address can occur as a GVA presented to the GTLB or as a GPA presented to the RTLB.

A consequence of the multi-stage translation is that a GVA that is normally unmapped may result in a GPA that is mapped by the RTLB. Additionally, a GVA that has some particular attribute associated with it will be translated to a GPA. A guest operating system may specify that an address should be unmapped by the guest TLB but may have no control over the root TLB. Thus, an unmapped GVA may become a mapped GPA. Generally, this would be the appropriate because the RTLB is controlled by a hypervisor, which has final control over the RPA associated with a GPA. However, for some types of transactions, if the GVA is unmapped or has some particular attribute, it may be beneficial to bypass subsequent address translations and allow the RPA to be equal to the GPA.

Accordingly, example embodiments may provide for selectively bypassing at least a portion of an address translation based on an indication in a received address. FIG. 13 illustrates a bypass control in one example, which may be implemented by a memory controller (e.g., memory controller 108 of FIG. 1) or by other hardware and/or software. A GTLB translation 1320 may provide a translated GPA corresponding to a GVA input, operating comparably to a GTLB lookup described above. Likewise, a RTLB translation 1330 may provide a translated RPA corresponding to a GPA input, operating comparably to a RTLB lookup described above.

The bypass control may provide for selectively bypassing translation at one or both of the GTLB 1320 and RTLB 1330 translations based on an attribute of the address or other indication. If a bypass is enabled, the address may be transformed (e.g., via address masking) by a fixed transform 1365 in place of the GTLB translation 1320 and/or a fixed transform 1366 in place of the RTLB translation 1330. In one embodiment, a set of bypass bits 1370 under control of privileged software are used to bypass the RTLB translation 1330. The bypass determination 1360 may be a function of the original GVA and/or attributes of that GVA and the state of the bypass bit. For example, in the MIPS architecture, a bit may be defined such that all GVA in KSEG0 (an unmapped virtual address segment) are transformed to GPAs (via address masking at the fixed transformation 1365), and the GPAs are transformed to RPAs (via address masking at the fixed transformation 1366), thereby bypassing both the GTLB translation 1320 and the RTLB translation 1330. In such a configuration, a GPA may equal a GVA after an address mask is applied, and a RPA would be equal to a GPA after a further address mask is applied. In some embodiments, an address mask may not be required between GPAs and RPAs, meaning that the GPAs are identical to the RPAs. In this example, the guest address space contains both a memory space and an input/output (I/O) space. Each of these addresses spaces may be further divided into multiple different address spaces.

A bypass determination may cause the RTLB translation 1330 to be bypassed if the GVA is contained in the address space associated with a corresponding bypass bit 1370. Each of the bypass bits may relate to an associated address space, meaning the translation may be bypassed if the received address belongs to a given address space and the bypass bit is enabled for the given address space. For example, a bypass bit 1370 may cause the RTLB translation 1330 to be bypassed if the bypass bit is set to "1" and the original GVA resides in the corresponding address space.

Figure 14:
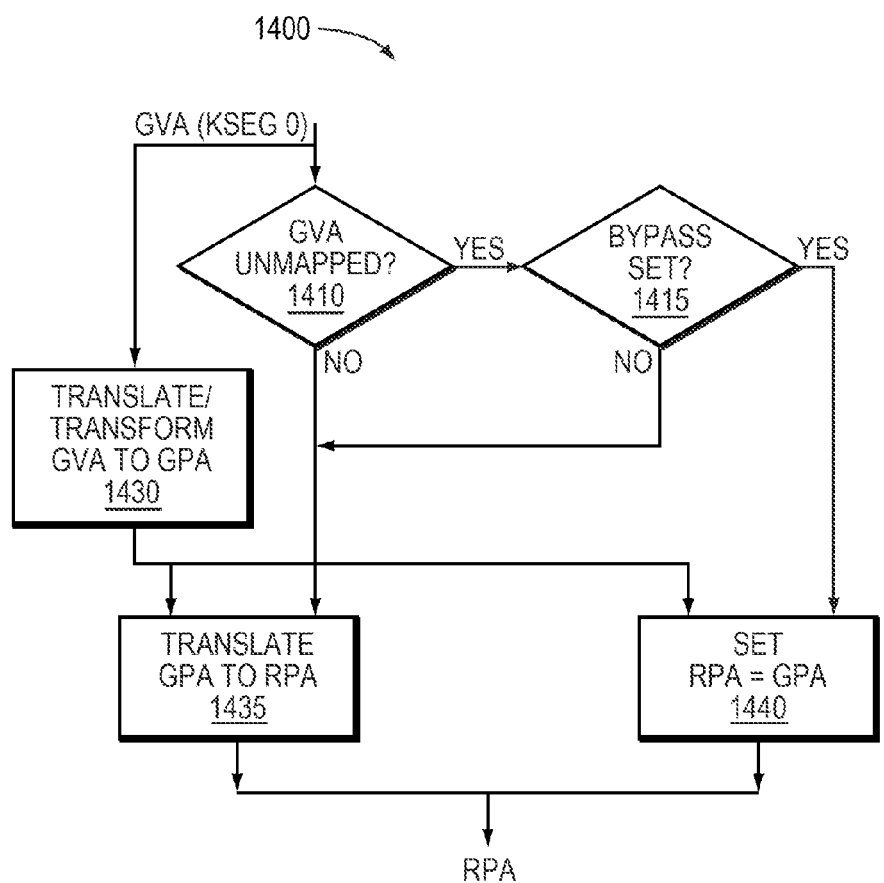
FIG. 14 is a flow diagram illustrating a process of selectively bypassing address translations.

FIG. 14 is a flow diagram illustrating a process 1400 of selectively bypassing address translations. Upon receiving a GVA, it is determined whether the GVA is mapped to a GPA, or specifies an unmapped address space (1410). A memory controller (or other hardware or software) translates or transforms the GVA to a GPA (1430) dependent on this determination. If the GVA is unmapped, then a bypass bit (e.g., bypass bit 1370 of FIG. 13) is referenced to determine whether a bypass is enabled (1415). Which bypass bit to use may be determined by the segment of the address space to which the GVA belongs. If the corresponding bypass bit is enabled, then an RPA may be produced being equal to the GPA (with or without transforming the GPA with an address mask) (1440). If the GVA is not unmapped, or the bypass is not enabled, then the GPA is instead translated to a RPA by accessing a RTLB (1435).

In the case of a bypass of a GTLB only (i.e., continuing to access the RTLB, a guest operating system may determine to bypass translation to access physical memory directly. However, a hypervisor may prohibit such direct access, and therefore continue to cause the GPA (resulting from a GTLB bypass) to be translated to a RPA.

A μTLB, as described above, may cache translations from GVAs to RPAs. Thus, in the case of a bypass, the result of a bypass may or may not be cached in the μTLB. If the result is not cached in the μTLB, then a μTLB miss may occur on subsequent accesses, and the bypass determination and masking may be repeated.

While this invention has been particularly shown and described with references to example embodiments thereof, it will be understood by those skilled in the art that various changes in form and details may be made therein without departing from the scope of the invention encompassed by the appended claims.

What is claimed is:

1. A circuit comprising:
   a first cache configured to store translations between address domains, the first cache including first and second logical portions, the first logical portion configured to store translations between a first address domain and a second address domain, the second logical portion configured to store translations between the second address domain and a third address domain;
   a second cache configured to store translations between the first address domain and the third address domain based on entries in the first cache;
   a third cache configured to store tags associated with the translations of the first and second cache; and
   a processor configured to 1) write an entry to the third cache, the entry including a subset of fields populated from a corresponding translation stored at the second cache, and 2) detect a deleted entry in at least one of the first logical portion and the second logical portion and invalidate corresponding entries in the second and third caches;
   wherein the processor is further configured, in response to detecting an absence of a matching entry in the second cache, to match the address request against the first cache, the address result corresponding to an entry in the first cache.

2. The circuit of claim 1, wherein the processor is further configured to match an address request against the second cache and output a corresponding address result.

3. The circuit of claim 1, wherein the processor is further configured to match an address request against the third cache to locate a corresponding entry in the third cache.

4. The circuit of claim 1, wherein the processor is further configured to detect a deletion of an entry in the second logical portion and invalidate corresponding entries in the second and third caches.

5. The circuit of claim 1, wherein the processor is further configured to identify the corresponding entries in the second and third caches via an identifier identifying a translation common to the deleted entry and the corresponding entries in the second and third caches.

6. The circuit of claim 1, wherein each entry in the second cache includes a bit indicating whether the entry comprises an address from the first address domain or the second address domain.

7. The circuit of claim 6, wherein the processor is further configured to locate the corresponding entries in the second and third caches via the bit.

8. The circuit of claim 1, wherein the processor is further configured to write an entry to the second cache based on entries in the first cache.

9. The circuit of claim 8, wherein the processor is further configured to locate entries in the first and second logical portions having a common second address domain, the processor writing the entry to the second cache based on the located entries in the first and second logical portions.

10. The circuit of claim 1, wherein the first address domain is a guest virtual address domain, the second address domain is a guest physical address domain, and the third address domain is a root physical address domain.

11. A method of caching address
   translations in a memory architecture, comprising:
   storing translations between a first address domain and a second address domain to a first logical portion of a first cache;
   storing translations between the second addressing domain and a third address domain to a second logical portion of the first cache;
   storing translations between the first address domain and the third address domain, based on entries in the first cache, to a second cache; and
   storing tags associated with the translations of the first and second cache to a third cache;
   writing an entry to the third cache, the entry including a subset of fields populated from a corresponding translation stored at the second cache;
   detecting a deleted entry in at least one of the first logical portion and the second logical portion;
   invalidating corresponding entries in the second and third caches; and in response to detecting an absence of a matching entry in the second cache, matching the address request against the first cache, the address result corresponding to an entry in the first cache.

12. The method of claim 11, further comprising matching an address request against the second cache and output a corresponding address result.

13. The method of claim 11, further comprising matching an address request against the third cache to locate a corresponding entry in the second cache.

14. The method of claim 11, further comprising detecting a deletion of an entry in the second logical portion and invalidate corresponding entries in the second and third caches.

15. The method of claim 11, further comprising identifying the corresponding entries in the second and third caches via an identifier identifying a translation common to the deleted entry and the corresponding entries in the second and third caches.

16. The method of claim 11, wherein each entry in the second cache includes a bit indicating whether the entry translates from the first address domain or the second address domain.

17. The method of claim 16, further comprising locating the corresponding entries in the second and third caches via the bit.

18. The method of claim 11, further comprising writing an entry to the second cache based on entries in the first cache.

19. The method of claim 18, further comprising:
locating entries in the first and second logical portions having a common second address domain; and
writing the entry to the second cache based on the located entries in the first and second logical portions.

20. The method of claim 11, wherein the first address domain is a guest virtual address domain, the second address domain is a guest physical address domain, and the third address domain is a root physical address domain.

21. A circuit comprising:
a translation lookaside buffer (TLB) configured to store translations between address domains, the TLB addressable as a guest TLB and a root TLB, the guest TLB configured to store translations between a guest virtual address (GVA) domain and a guest physical address (GPA) domain, the root TLB configured to store translations between the GPA domain and a root physical address (RPA) domain;
a collapsed TLB configured to store translations between the GVA domain and the RPA domain based on entries in the TLB;
a data cache configured to store tags associated with the translations of the TLB and collapsed TLB; and
a processor configured to 1) write an entry to the data cache, the entry including a subset of fields populated from a corresponding translation stored at the collapsed TLB, and 2) detect a deleted entry in the guest TLB and invalidate corresponding entries in the collapsed TLB and data cache;
wherein the processor is further configured, in response to detecting an absence of a matching entry in the collapsed TLB, to match the address request against the TLB, the address result corresponding to an entry in the TLB.

* * * * *